(12) United States Patent
Lee

(10) Patent No.: US 8,672,576 B2
(45) Date of Patent: Mar. 18, 2014

(54) BALL JOINT

(75) Inventor: Suhyoung Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 58 days.

(21) Appl. No.: 13/242,080

(22) Filed: Sep. 23, 2011

(65) Prior Publication Data

US 2012/0263520 A1   Oct. 18, 2012

(30) Foreign Application Priority Data

Apr. 18, 2011  (KR) ........................ 10-2011-0035575

(51) Int. Cl.
*F16C 11/00*   (2006.01)
(52) U.S. Cl.
USPC ....................................................... 403/122
(58) Field of Classification Search
USPC .............. 403/76, 90, 114, 115, 122, 135, 144
See application file for complete search history.

(56) References Cited

U.S. PATENT DOCUMENTS

| 3,253,330 A | * | 5/1966 | Davies ........................ 29/441.1 |
| 4,084,913 A | * | 4/1978 | Schenk ........................ 403/141 |
| 4,457,188 A | * | 7/1984 | Hauser ........................ 74/473.36 |
| 4,630,957 A | * | 12/1986 | Ausprung ........................ 403/76 |

* cited by examiner

*Primary Examiner* — Michael P Ferguson
*Assistant Examiner* — Daniel Wiley
(74) *Attorney, Agent, or Firm* — Saliwanchik, Lloyd & Eisenschenk

(57) ABSTRACT

Disclosed is a ball joint, the ball joint capable of preventing damage due to interference between parts even when the ball joint is tilted at a maximum angle and guaranteeing operational reliability, and including a spherical ball stud, a shaft coupled to a side of the ball stud, a holder having a seat portion to surround an outer circumference of the ball stud, and an elastic portion protruding upwards from the holder, having on an inner circumference thereof an inclined surface to limit a tilting angle of a portion of the shaft adjacent to the ball stud, and undergoing elastic deformation when the shaft is tilted at a maximum angle, so that the elastic portion absorbs shock when the ball joint is rotated to the maximum, thus preventing damage or removal of parts.

1 Claim, 2 Drawing Sheets

BALL JOINT

CROSS-REFERENCE TO RELATED APPLICATION

This application claims the benefit under 35 U.S.C. §119 of Korean Application No. 10-2011-0035575, filed Apr. 18, 2011, which is hereby incorporated by reference in its entirety.

BACKGROUND OF THE INVENTION

1. Field of the Invention

The present invention relates generally to ball joints and, more particularly, to a ball joint, which can prevent damage due to interference between contact parts even when the ball joint is tilted at a maximum angle, and can guarantee operational reliability.

2. Description of the Related Art

A ball joint has been widely used as connecting means with a spherical joint function.

The ball joint is mainly used to connect a steering shaft of a steering device or a headlamp leveling device installed in a luxury vehicle to adjust an irradiation angle of a headlamp depending on changed position of a vehicle body. In addition to the steering shaft or the headlamp leveling device, the ball joint is used as a means for connecting members of various devices.

FIG. 1 is a side sectional view illustrating a conventional ball joint.

The ball joint includes a ball stud 1 that approximately takes a shape of a sphere, and a holder 2 that seats the ball stud 1 therein to support rotation of the ball stud 1.

The ball stud 1 is generally coupled to a long bar-shaped shaft 3, and the holder 2 is coupled to an additional device or linkage, so that the device or linkage may be tilted at a desired angle with respect to a center of the ball stud 1.

Generally, an inclined surface is formed on an upper portion of the holder 2 to permit movement of the shaft 3, and a nut-shaped stopper 4 is provided on a portion of the shaft 3 adjacent to the ball stud 1.

The inclined surface and the stopper 4 function to limit a rotating angle of the shaft 3 relative to the holder 2.

However, when the shaft 3 of the ball joint rotates at a maximum angle, an outer surface of the shaft 3 receives load while being in contact with the inclined surface of the holder 2. In the case of having the stopper 4 as such, a portion of the stopper 4 maintains contact with an upper surface of the holder 2.

When the shaft 3 is subjected to a predetermined torque around a contact portion, the ball joint may be partially damaged. If the damage is serious, the ball stud 1 may be undesirably disjoined from the holder 2.

This becomes more serious when the shaft 3 is rotated in the state in which it is tilted at a maximum angle and is subjected to load.

In serious cases, the damage to the ball joint by the operation may lead to erroneous operation of the entire device or malfunction of the device.

BRIEF SUMMARY

Accordingly, the present invention has been made keeping in mind the above problems occurring in the prior art, and an object of the present invention is to provide a ball joint, which can prevent parts of the ball joint from being damaged even when the ball joint is rotated at a maximum angle, in addition to improving operational reliability.

In order to accomplish the above object, there is provided a ball joint comprising a spherical ball stud, a shaft coupled to a side of the ball stud, a holder having a seat portion to surround an outer circumference of the ball stud, and an elastic portion protruding upwards from the holder, having on an inner circumference thereof an inclined surface to limit a tilting angle of a portion of the shaft adjacent to the ball stud, and undergoing elastic deformation when the shaft is tilted. Thus, the elastic portion absorbs shock when the ball joint is rotated to the maximum, thus preventing damage or removal of parts.

Further, the elastic portion protrudes upwards from the holder in a ring shape. Thus, the elastic portion may support rotations of the shaft at all angles.

The ball joint further includes a stopper protruded in a ring shape and provided on an outer circumferential surface of the shaft adjacent to the ball stud. Thus, a rotating angle of the ball joint can be more reliably limited.

The ball joint further includes a receiving space formed around an outer circumference of the elastic portion for receiving a portion of the stopper when the shaft is tilted at a maximum angle. Thus, damage or removal of the parts caused by the stopper can be prevented.

Further, the receiving space is formed around the outer circumference of the elastic portion in a ring shape. Thus, the receiving space may cope with the rotations of the shaft at all angles.

The ball joint according to the present invention constructed as described above is advantageous in that its holder includes an elastic portion to support an outer circumference of a shaft and absorb shock through elastic deformation, and a receiving space formed around an outer circumference of the elastic portion to permit elastic deformation and receive a stopper, thus minimizing interference between parts and considerably reducing a removal possibility of a ball stud, thereby improving durability and operational reliability of the ball joint.

DETAILED DESCRIPTION

Hereinafter, a ball joint in accordance with a preferred embodiment of the present invention will be described in detail with reference to the accompanying drawings.

Figure 1:
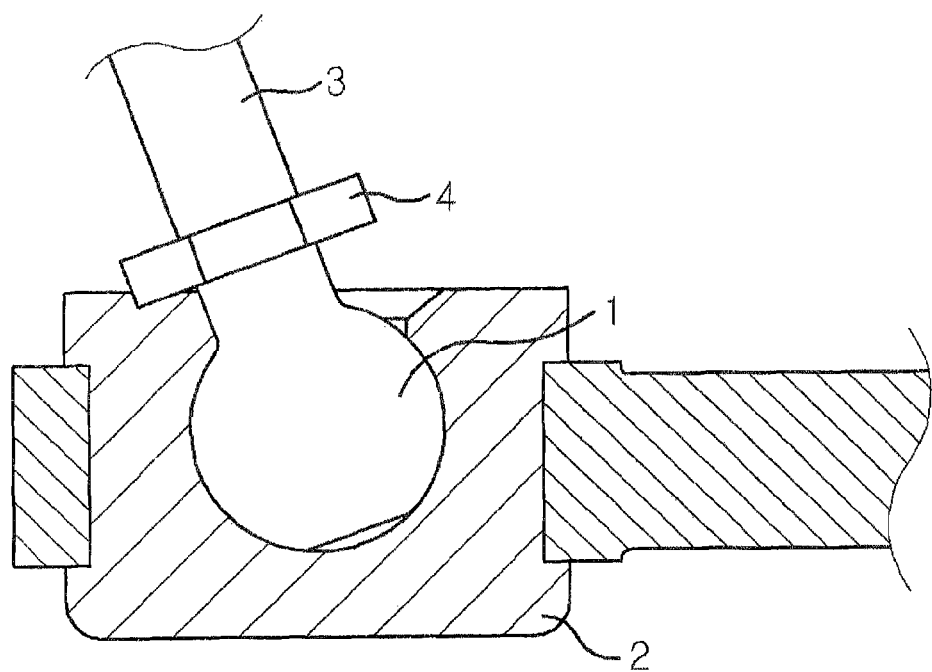
FIG. 1 is a side sectional view illustrating a conventional ball joint.
Figure 2:
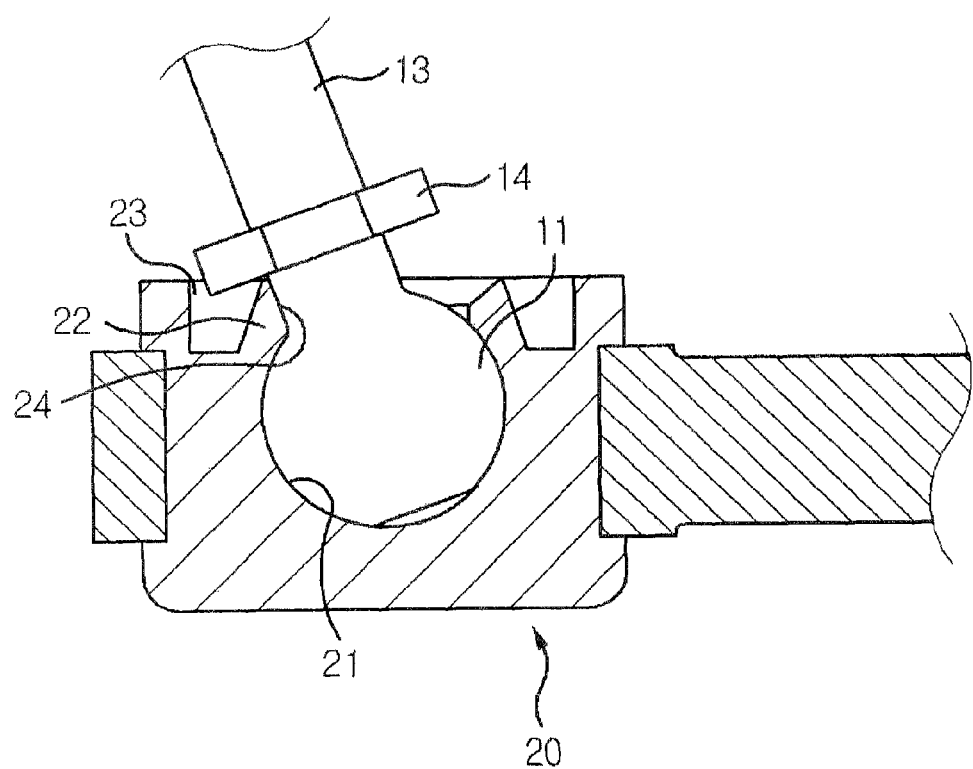
FIG. 2 is a side sectional view illustrating a ball joint in accordance with an exemplary embodiment of the present invention.

FIG. 2 is a side sectional view showing a ball joint according to the present invention.

The ball joint includes a spherical ball stud 11 and a shaft 13 extending from a side of the ball stud 11. The shaft 13 takes a shape of a long cylinder, and is tiltable and rotatable as the ball stud 11 rotates.

The holder 20 has a seat portion 21 therein to surround an outer circumferential surface of the ball stud 11, and rotatably guides the ball stud 11 while maintaining a center thereof at a predetermined position, in addition to preventing removal of the ball stud 11.

Thus, the seat portion 21 does not surround the entire outer circumferential surface of the ball stud 11, and has on an upper portion thereof a predetermined space, namely, an opening to permit rotation of the ball stud 11.

The shaft 13 and the holder 20 serve as a connecting member for connecting members that require a relative tilting or rotating movement.

As long as the holder 20 has the seat portion 21 therein, the holder 20 may have various shapes. For example, the holder 20 may comprise a plurality of members, including a seat that has a seat portion, a socket that holds the seat at an outer circumference thereof, and a cap that covers a lower portion after the ball stud 11 has been coupled.

As described above, when the shall 13 connected to the ball stud 11 in the opening is tilted at a maximum angle, the shaft 13 comes into contact with a portion of the holder 20 around the opening, so that there occurs interference between the shaft 13 and the holder 20.

Thus, the opening of the holder 20 serves to limit a tilting angle. Meanwhile, if torque is applied to the shaft 13 around the contact portion, the ball stud 11 is subjected to strong torque in a direction that the ball stud 11 is removed, according to the principle of the lever.

Such an undesirable load may impair the holder 20, the shaft 13 and the ball stud 11. This may separate the ball stud 11 from the seat portion 21, as described above.

Thus, according to the concept of the present invention, an elastic portion 22 is provided outside a portion of the shaft 13 coupled to the ball stud 11 in such a way as to protrude upwards from the holder 20.

The elastic portion 22 includes an inclined surface 24 that is downwardly inclined towards an inner circumference thereof. The inclined surface 24 serves as a kind of seat to support an outer circumference of the shaft 13 when the shaft 13 is tilted to the maximum.

Preferably, the elastic portion 22 takes a shape of a ring that protrudes upwards while being spaced apart from an outer circumference of the shaft 13, the ball stud 11, or a junction between the shaft 13 and the ball stud 11 by a predetermined interval.

Thus, even if the shaft 13 is tilted in any direction, the shaft 13 can be stably supported by the inclined surface 24.

The elastic portion 22 is made of a material that is elastically deformable and restorable when the shaft 13 is subjected to a load at a maximum tilting angle.

The elastic portion 22 may be integrated with the holder 20. It is preferable that the elastic portion 22 be injection molded together with the holder 20 as a molded product.

Since the elastic portion 22 is formed to support a side of the shaft 13 as such, the elastic portion 22 is deformed outwards to absorb shock if the shaft 13 is tilted at the maximum angle.

Thus, this can reduce a force exerted in a direction that the ball stud 11 is removed from the holder 20, thus preventing parts from being damaged and preventing the removal of the ball stud 11.

Further, a stopper 14 is provided on an outer circumference of the portion of the shaft 13 coupled to the ball stud 11.

The stopper 14 takes a shape of a ring or nut protruding outwards from the shaft 13.

Such a stopper 14 may limit the maximum tilting angle of the shaft 13 in cooperation with the inclined surface 24, but may cause damage to the ball joint.

Thus, it is preferable that a space be defined in an upper portion of the holder 20 to prevent interference due to rotation of the stopper 14.

The space is an annular receiving space 23 that is defined outside the elastic portion 22, and serves to receive a portion of the stopper 14 when the shaft 13 is tilted at the maximum angle.

In a detailed description, when the shaft 13 is tilted, an end of the stopper 14 is disposed downwards in the tilting direction of the shaft 13. Hence, the receiving space 23 is formed in consideration of a height of the stopper 14 disposed downwards when the shaft 13 is tilted at the maximum angle.

Further, the receiving space 23 provides a deformation space when the elastic portion 22 is elastically deformed outwards.

As described above, the ball joint according to the present invention is advantageous in that its holder includes the elastic portion 22 to support the outer circumference of the shaft 13 and absorb shock through elastic deformation, and the receiving space formed around the outer circumference of the elastic portion 22 to permit elastic deformation and receive the stopper 14, thus minimizing interference between parts and considerably reducing the removal possibility of the ball stud 11.

The foregoing description of the preferred embodiment has been presented for the purpose of illustration and description. It is not intended to limit the scope of the invention. It is intended that the scope of the invention be defined by the claims.

What is claimed is:
1. A ball joint, comprising:
a spherical ball stud;
a shaft coupled to a side of the ball stud;
a holder having a seat portion to surround an outer circumference of the ball stud;
a stopper protruded in a ring shape and provided on an outer circumferential surface of the shaft adjacent to the ball stud, the stopper including a bottom surface facing the seat portion, and an outer edge at the outer periphery of the bottom surface;
an elastic portion protruding upwards from the holder in a ring shape, and having on an inner circumference thereof an inclined surface, the inclined surface terminating at an upper edge facing the bottom surface of the stopper, the elastic portion being elastically deformed when the shaft is tilted; and
a receiving space formed around an outer circumference of the elastic portion radially outward from the upper edge, the receiving space configured to receive the outer edge of the stopper when the shaft is tilted,
wherein the elastic portion and the holder are formed in one body and
wherein when the shaft is tilted at a maximum angle, a portion of the shaft between the stopper and the ball stud abuts the inclined surface of the elastic portion, the bottom surface of the stopper abuts the upper edge of the elastic portion, and the outer edge of the stopper is received within the receiving space.

* * * * *